United States Patent
Jamadagni et al.

(10) Patent No.: US 8,547,898 B2
(45) Date of Patent: Oct. 1, 2013

(54) ESTIMATING ABSOLUTE POWER LEVEL IN A MUROS SYSTEM

(75) Inventors: Satish Nanjunda Swamy Jamadagni, Byrasandra (IN); Sarvesha Anegundi Ganapathi, Byrasandra (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 829 days.

(21) Appl. No.: 12/700,361

(22) Filed: Feb. 4, 2010

(65) Prior Publication Data

US 2010/0203897 A1 Aug. 12, 2010

(30) Foreign Application Priority Data

Feb. 12, 2009 (IN) .............................. 311/CHE/2009

(51) Int. Cl.
*H04W 72/04* (2009.01)
*H04B 7/185* (2006.01)

(52) U.S. Cl.
USPC .......................................... 370/318; 455/450

(58) Field of Classification Search
USPC .......................................... 370/318; 455/450
See application file for complete search history.

(56) References Cited

U.S. PATENT DOCUMENTS

| 6,154,450 | A | 11/2000 | Wallentin et al. | |
|---|---|---|---|---|
| 8,374,156 | B2 * | 2/2013 | Yu et al. | 370/337 |
| 2002/0111183 | A1 | 8/2002 | Lundby | |
| 2002/0122513 | A1 * | 9/2002 | Oksala et al. | 375/345 |
| 2003/0054825 | A1 | 3/2003 | Chen et al. | |
| 2003/0185159 | A1 * | 10/2003 | Seo et al. | 370/278 |
| 2003/0231655 | A1 * | 12/2003 | Kelton et al. | 370/468 |
| 2004/0170148 | A1 * | 9/2004 | Parkkinen et al. | 370/337 |
| 2005/0099973 | A1 | 5/2005 | Qiu et al. | |
| 2005/0213636 | A1 * | 9/2005 | Zeira et al. | 375/130 |
| 2008/0130725 | A1 * | 6/2008 | Yu et al. | 375/219 |
| 2008/0229168 | A1 * | 9/2008 | Murakami et al. | 714/751 |
| 2010/0302990 | A1 * | 12/2010 | Lopez et al. | 370/312 |
| 2010/0311410 | A1 * | 12/2010 | Lennartson et al. | 455/423 |
| 2010/0323685 | A1 * | 12/2010 | Lopez et al. | 455/422.1 |

(Continued)

FOREIGN PATENT DOCUMENTS

EP 1 187 362 A2 3/2002

OTHER PUBLICATIONS

3GPP TSG GERAN # 37 GP-080114, Adaptive Symbol Constellation for MUROS (Downlink), Feb. 18-22, 2008.*

*Primary Examiner* — Brandon Renner
*Assistant Examiner* — Faisal Choudhury
(74) *Attorney, Agent, or Firm* — Jefferson IP Law, LLP

(57) ABSTRACT

An apparatus and method for estimating an absolute power level in a Multiple Users Reusing One Single time slot (MUROS) system are provided. The absolute value of power level of the MUROS user is received by the MUROS user from a Base Transceiver Station (BTS). The MUROS user also determines the mean value of its own signal strength. The absolute value of power level of the other user paired with the MUROS user is estimated using the received absolute value of power level of the MUROS user and the determined mean value of signal strength. The estimated absolute value of power level of the other user and the absolute value of power level of the MUROS user are further used by the MUROS user to estimate its channel. Information about the estimated channel of the MUROS user is provided to the BTS by the MUROS user and the BTS uses this information to allocate power to the two users which are paired for MUROS.

12 Claims, 4 Drawing Sheets

(56) References Cited

U.S. PATENT DOCUMENTS

| | | | |
|---|---|---|---|
| 2011/0007624 A1* | 1/2011 | Lopez | 370/203 |
| 2011/0044299 A1* | 2/2011 | Spencer et al. | 370/336 |
| 2011/0149778 A1* | 6/2011 | Yu | 370/252 |
| 2011/0170482 A1* | 7/2011 | Dhanda | 370/328 |
| 2011/0267968 A1* | 11/2011 | Yu et al. | 370/252 |

* cited by examiner

ESTIMATING ABSOLUTE POWER LEVEL IN A MUROS SYSTEM

PRIORITY

This application claims the benefit under 35 U.S.C. §119(a) of an Indian patent application filed on Feb. 12, 2009 in the Indian Intellectual Property Office and assigned Serial No. 311/CHE/2009, the entire disclosure of which is hereby incorporated by reference.

BACKGROUND OF THE INVENTION

1. Field of the Invention

The present invention relates to wireless resource management methods. More particularly, the present invention relates to a power estimation method in a Multiple Users Reusing One Single time slot (MUROS) system when two users are paired.

2. Description of the Related Art

In theory, MUROS aims to multiplex four GSM-HR mobile stations (for half rate) and two GSM-FR mobile stations (for full rate) onto one time slot, expecting to provide improvement for both the full rate as well as the half rate channels. Thus, MUROS intends to enhance the voice capacity (cell capacity) by pairing two or more users (or mobile stations) onto a single timeslot.

A prerequisite in MUROS is to maintain good link quality for the paired users because the pairing may include a legacy user. Thus, while pairing two users for MUROS, care should be taken that the relative power control and power estimation as calculated by the two users is accurate. More specifically, because paired users in MUROS are in the same time slot (same cell), the paired users face a dominant interference due to each other's presence. Such dominant interference is different from the interference experienced from neighbor cells. Thus, inaccurate power estimation, coupled with the potential for dominant interference, may lead to higher Bit Error Rates (BERs) for the paired users. Moreover, inaccurate power estimation adversely affects channel estimation and further decoding of received information by the user.

For paired users including a legacy user and a MUROS user, the existing system may support the legacy user by boosting the power level for the legacy user while reducing it for the MUROS user. Thus, there is a high risk that the MUROS user may inaccurately estimate its power level by decoding an incorrect signal and thus receive a very high BER from the Base Transceiver Station (BTS) and subsequently report the same high BER to the BTS. This cascading effect will affect the power control leading to further reporting of incorrect BERs by the MUROS user.

Various prior art methods, such as described by US20050099973 and U.S. Pat. No. 6,154,450, discuss methods for power estimation at a BTS by establishing transmission power control based on an estimated inter-cellular interference power level and reception quality to ramp up the transmit power; or a BTS transmitting a power level command to a 'Mobile Station' (hereinafter 'MS') to ramp up the transmit power value based on a predetermined value obtained by comparing the interference power level from the neighbouring cells. However, these methods do not address the issue when the interference is within the same cell and also involves a MUROS user. Few other known methods for power estimation typically employ least squares techniques that are converging in nature. Such techniques being very slow are inefficient and thus not suitable for a MUROS system. Thus a need is felt to provide a method of power estimation in the users in a MUROS system so as to enable them function efficiently in conjunction with the existing power control mechanisms of a GSM network.

SUMMARY OF THE INVENTION

An aspect of the present invention is to address at least the above-mentioned problems and/or disadvantages and to provide at least the advantages described below. Accordingly, an aspect of the present invention is to provide an apparatus and method to eliminate, or at least significantly alleviate, the limitations and the drawbacks of the prior art including the ones as mentioned above. Exemplary embodiments of the present invention include a method and a MUROS mobile station for estimating an absolute power level in a MUROS system.

In accordance with an aspect of the present invention, a method for estimating an absolute power level in a Multiple Users Reusing One Single time slot (MUROS) system is provided. The method includes receiving an absolute value of power level of the MUROS mobile station, which is paired with another mobile station, by the MUROS mobile station from a BTS, determining a mean value of signal strength by the MUROS mobile station, and estimating the absolute value of power level of the other mobile station using the received absolute value of power level of the MUROS mobile station and the determined mean value of signal strength. In an exemplary implementation, the channel of the MUROS mobile station is estimated by using the estimated absolute value of power level of the mobile station and the received absolute value of power level of the MUROS mobile station. In another exemplary implementation, the mean value of signal strength of the MUROS mobile station is deduced at the MUROS mobile station using a complex symbol received from the BTS. The method may further include receiving information about the estimated channel of the MUROS mobile station by the BTS and using this information to appropriately allocate power to the two mobile stations which are paired for MUROS. In an exemplary implementation, the MUROS mobile station could pair with another MUROS mobile station or a legacy mobile station.

In accordance with another aspect of the present invention, an apparatus for estimating an absolute power level in a Multiple Users Reusing One Single time slot (MUROS) system is provided. The apparatus includes a MUROS mobile station that comprises a processing unit for estimating an absolute value of power level of the MUROS mobile station which is paired with a mobile station. The MUROS mobile station also comprises another processing unit for estimating a channel of the MUROS mobile station that uses the estimated absolute value of power level of the mobile station and a mean value of signal strength of the MUROS mobile station.

In accordance with yet another aspect of the present invention, a BTS system for estimating an absolute power level in a Multiple Users Reusing One Single time slot (MUROS) system is provided. The BTS system comprises a processing unit for transmitting an absolute value of power level of a MUROS mobile station to the MUROS mobile station wherein, the MUROS mobile station is paired with a mobile station. The mobile station could be another MUROS mobile station or a legacy mobile station. The BTS system also comprises another processing unit for allocating power appropriately to the paired mobile stations by using information about channel estimation of the MUROS mobile station received from the MUROS mobile station. The paired mobile stations may include a MUROS mobile station and a legacy mobile station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Several exemplary embodiments of the present invention will now be described in detail with reference to the annexed drawings. In the following description, a detailed description of known functions and configurations incorporated herein has been omitted for clarity and conciseness.

There may be several possible technical realizations of a Multiple Users Reusing One Single time slot (MUROS) system. In one example, user signals of the two mobile stations are mapped to the real and imaginary parts of the baseband signal (a complex symbol). These are called I and Q sub-channels, which are orthogonal to each other under some conditions.

Figure 1A:
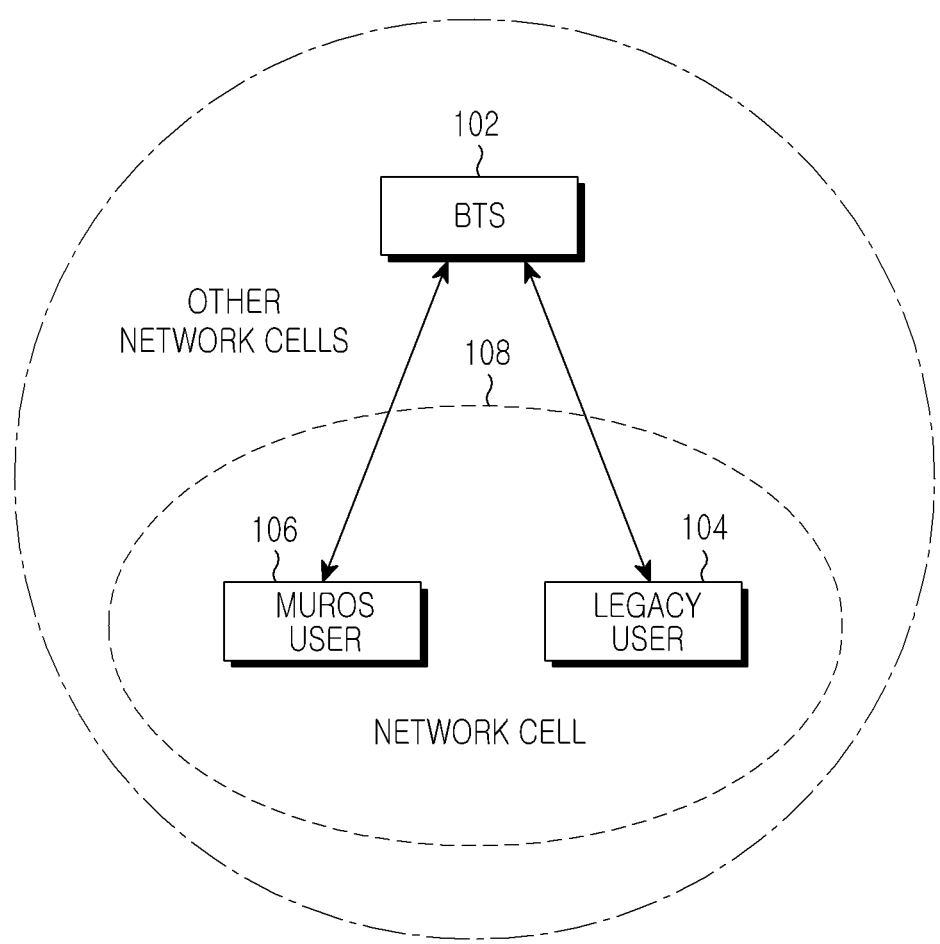
FIG. 1A illustrates a pairing of a Multiple Users Reusing One Single time slot (MUROS) mobile station (MUROS user) and a legacy mobile station (legacy user) for MUROS according to an exemplary embodiment of the present invention.

FIG. 1A illustrates a pairing of a MUROS mobile station (MUROS user) and a legacy mobile station (legacy user) for MUROS according to an exemplary embodiment of the present invention.

Referring to FIG. 1A, a pairing of a MUROS user (106) and a legacy user (104) into a single cell (108) (or a single time slot) for MUROS, where both the users are connected to the same Base Transceiver Station (BTS), is illustrated. The environment illustrated here is just an exemplary one that may involve a pairing between two MUROS users as well. However, for a better understanding of the invention, only the pairing between a MUROS user and a legacy user is considered throughout the description. The MUROS user (106) indicates a mobile station having the capability for MUROS but at the same time possessing all the features and capabilities that are required to function smoothly in a network of an existing (i.e., legacy) telecommunication system. The network cell (108) as mentioned here may relate to the cell configuration of any existing telecommunication system that may include, but is not limited to, a Global System for Mobile communication (GSM), a General Packet Radio Service (GPRS), an Enhanced Data rate for GSM Evolution (EDGE) or any other prevalent telecommunication system of similar nature. Thus, the legacy user (104) or the BTS (102) may indicate entities as defined to possess functionalities and features to enable them to function suitably in their respective telecommunication system. However, for a better understanding of the present invention and merely for convenience, the telecommunication system is considered to be a GSM system throughout this description.

Figure 1B:
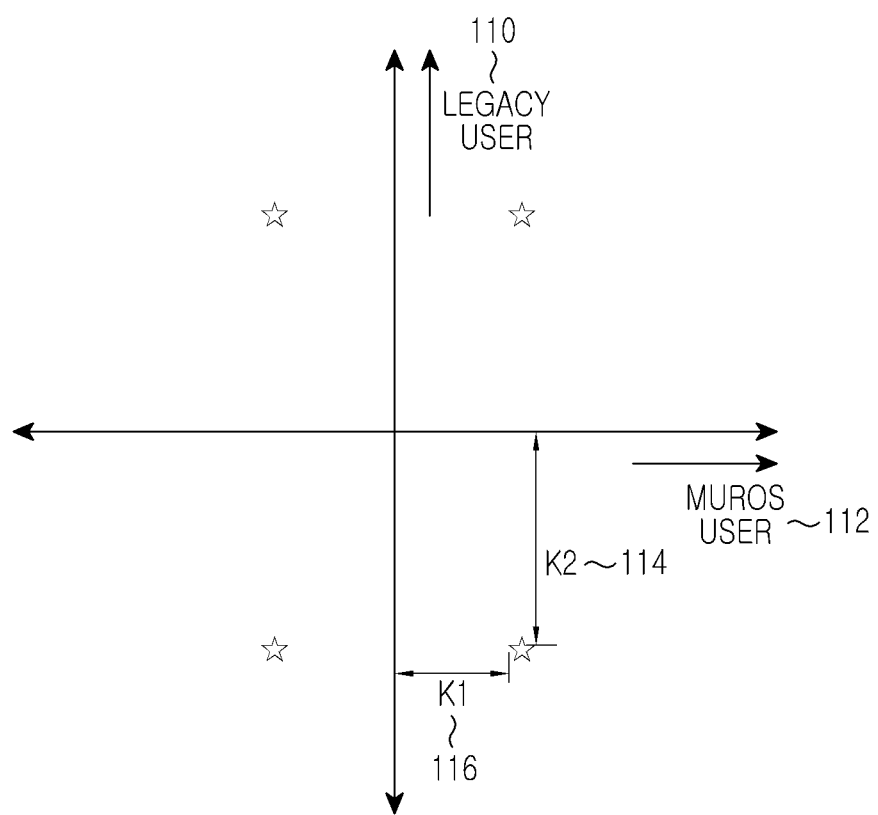
FIG. 1B illustrates a constellation formed by absolute power levels of paired users according to an exemplary embodiment of the present invention.

FIG. 1B illustrates a constellation formed by absolute power levels of paired users according to an exemplary embodiment of the present invention.

Under certain conditions, similar to the one stated above but not limited thereto, a MUROS constellation involving the absolute power levels of the paired users is formed as is illustrated by FIG. 1B, where K1 (116) is the absolute power level of the MUROS user (112) and K2 (114) is the absolute power level of the legacy user (110). Though the absolute values of the paired users as depicted here seem to be orthogonal, their actual positions and values may vary depending upon system and channel conditions that may involve various sorts of interferences. However, these variations do not affect the scope of the present invention and thus the constellation should not to be construed as a limitation.

Figure 2:
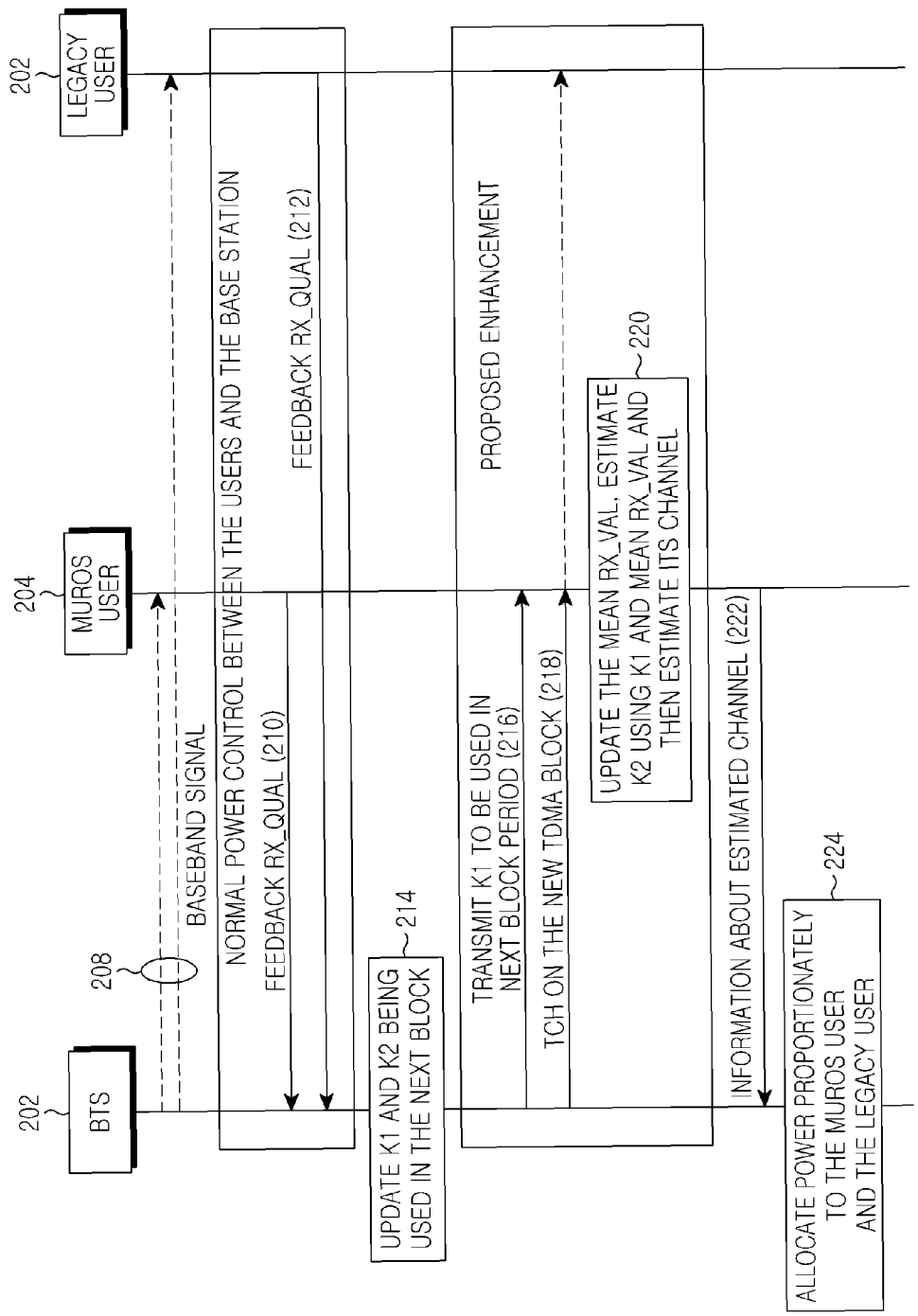
FIG. 2 illustrates a method for estimating an absolute power level in a MUROS system, according to an exemplary embodiment of the present invention.

FIG. 2 illustrates a method for estimating an absolute power level in a MUROS system according to an exemplary embodiment of the present invention.

Referring to FIG. 2, a MUROS user (204) and a Legacy user (206) receive a baseband signal (208) in a downlink transmission from a BTS (202) as per existing signaling in GSM. As described herein above (referring FIG. 1B), the baseband signal is a complex symbol that carries the user signals through its real and imaginary components for the paired users in MUROS. The MUROS user (204) then determines the signal strength, which is referred to here as the RX_VAL, of the received signal and estimates a mean of the signal strength, which is referred to here as the mean RX_VAL.

As per the normal power control mechanism between a user (or a mobile station) and a BTS, the users (204, 206) report to the BTS (202) about the quality of their respective channels. The reported information may include, but is not limited to, Bit Error Rate (BER), percentage of blocked calls, etc., that are affected by the estimated power levels of the user. The information is sent through a signaling called RX_QUAL (210, 212). The information received through RX_QUAL is used by the BTS (202) to update K1 and K2,as is illustrated at step 214.

The signal strength (RX_VAL), as observed by the MUROS user and as in most cases, is different from what was actually transmitted by the BTS. The channel estimation by the MUROS user would be affected owing to incorrect estimation of the absolute power level of the other user that is paired with the MUROS user (here, the legacy user) even if the MUROS user has received information about the other user's Training Sequence Codes (TSC). Thus, for an improved estimation of the channel and the subsequent decoding of the data by the MUROS user, MUROS user should have information about the absolute or relative power levels of the user that is paired with the MUROS user. The mean of the signal strength (mean RX_VAL) being estimated by the MUROS user is proportional to the sum of the power levels of both the components of the complex symbol. Thus, the MUROS user can then estimate the other user's power level using the estimated mean RX_VAL and the received power level of its own component. Accordingly, the information about the absolute power levels of the paired users is sent by the BTS to the paired users in MUROS.

As is illustrated at step 216, the BTS (202) transmits the absolute value of power level (K1) for the MUROS user to the MUROS user (204) in the preceding block period so that K1 can be used by the MUROS user (204) in the next block. The absolute value of power level for the MUROS user (204) can be sent using a power control command through a configurable signaling. The command can be sent through anyone of the signaling channels in GSM Edge Radio Access Network (GERAN), namely Slow Associated Control CHannel (SACCH), Fast Associated Control CHannel (FACCH), Enhanced Power Control CHannel (EPCCH), and/or Traffic CHannel (TCH). Subsequently, the baseband signal (complex symbol) is retransmitted by the BTS (202) to both users using the Time Division Multiple Access (TDMA) block through the TCH, as is illustrated at step 218. Upon receiving the current block, the MUROS user (204) determines the RX_VAL and estimates mean RX_VAL, as is illustrated at step 220. The MUROS user (204) estimates the absolute value of power level (K2) for the legacy user using the estimated mean RX_VAL and the received K1, as is illustrated at step 220. The estimated K2 along with K1 is further used by the MUROS user (204) to estimate its channel as is illustrated at step 220. Information about the estimated channel is then sent to the BTS (202) by the MUROS user (204), as is illustrated at step 222. The BTS (202) uses this information to proportionately allocate power to the two paired users, that is, the MUROS user and the Legacy user, as is illustrated at step 224.

Figure 3:
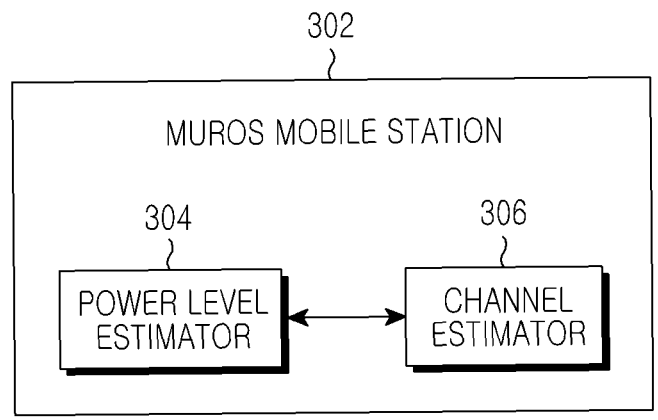
FIG. 3 illustrates a MUROS mobile station for estimating an absolute power level according to an exemplary embodiment of the present invention.

FIG. 3 illustrates a MUROS mobile station for estimating an absolute power level according to an exemplary embodiment of the present invention.

Referring to FIG. 3, a MUROS mobile station (302) for estimating the absolute power level is illustrated. The Power Level Estimator (304) is the processing unit in the MUROS mobile station (302) that determines the absolute value of power level (K2) of the Legacy user (206) using the absolute value of power level (K1) of the MUROS user (206) and the mean value of signal strength (mean RX_VAL) of the MUROS user, as is described herein above and could be referred to the method illustrated by FIG. 2. The estimated absolute value of power level of the Legacy user is then used by the Channel estimator (306). The Channel estimator (306) further uses this estimated absolute value and the absolute value of power level of the MUROS user (204) to estimate the Channel of the MUROS user (204).

Figure 4:
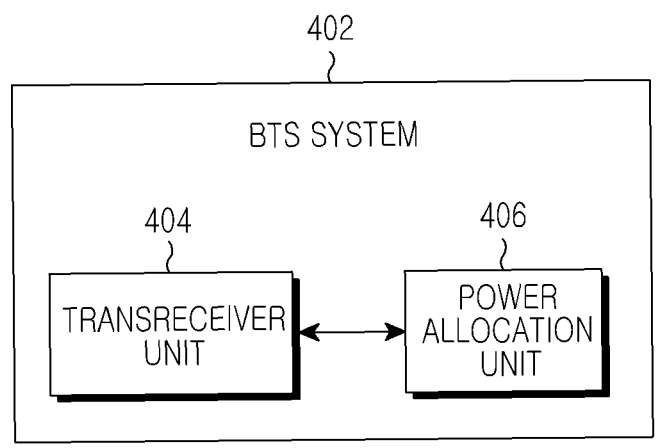
FIG. 4 illustrates a Base Transceiver Station (BTS) system that is communicating with a MUROS user according to an exemplary embodiment of the present invention.

FIG. 4 illustrates a BTS system that is communicating with a MUROS user according to an exemplary embodiment of the present invention.

Referring to FIG. 4, a BTS system is illustrated. The transceiver unit (404) transmits the absolute value of power level (K1) for the MUROS user (204) to the MUROS user (204), as is illustrated by FIG. 2. The Power Allocation unit (406) in BTS system (402) receives the information about the estimated Channel from the MUROS user (as described herein above and further illustrated at step 222 of FIG. 2). The Power Allocation unit (406) uses this information to decide how much power should be allocated to the two users (the MUROS user and the Legacy user) that are paired for MUROS.

Thus, knowledge about absolute values of its own power levels helps the MUROS user to estimate the absolute value of power level of the Legacy user which in turn leads to an improved estimation of the channel by the MUROS user. This would subsequently also lead to a reduction in BER that would be reported to the BTS by the MUROS user.

The problem and its solution as disclosed here pertain to an upcoming concept of reusing one timeslot to accommodate multiple users, which is termed MUROS. Exemplary embodiments of the invention as disclosed herein above address one aspect of the power control issues under MUROS. Existing power control mechanisms for mobile stations will have to be supplemented with the proposed invention of power estimation so as to enable the MUROS users to function more efficiently in the existing GSM telecommunication system.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for estimating an absolute value of power level, by a first mobile station included in a pair, in a Multiple Users Reusing One Single time slot (MUROS) system including the pair of two mobile stations connected to a Base Transceiver Station (BTS), the method comprising:

after transmitting a receiving quality for a complex symbol received from the BTS, receiving a first value of power level of the first mobile station updated based on the receiving quality;

determining a mean value of signal strength using the first value and the complex symbol; and after receiving the complex symbol re-transmitted from the BTS, estimating a second value of power level of a second mobile station included in the pair using the first value and the mean value of signal strength.

2. The method according to claim 1, further comprising:
estimating a channel for the first mobile station using the estimated second value and the first value; and
transmitting information about the estimated channel to the BTS.

3. The method according to claim 1, wherein the first mobile station is a MUROS mobile station and the second mobile station is a legacy mobile station, and
wherein the MUROS mobile station indicates a mobile station having the capability for MUROS.

4. A first mobile station included in a pair for estimating an absolute value of power level in a Multiple Users Reusing One Single time slot (MUROS) system including the pair of two mobile stations connected to a Base Transceiver Station (BTS), the first mobile station comprising:
a transceiver for receiving a first value of power level of the first mobile station updated based on the receiving quality from the BTS after transmitting a receiving quality for a complex symbol received from the BTS, and
a controller for determining a mean value of signal strength using the first value and the complex symbol, and for, after receiving the complex symbol retransmitted from the BTS, estimating a second value of power level of a second mobile station included in the pair using the first value and the mean value of signal strength.

5. The first mobile station according to claim 4, wherein the controller estimates a channel for the first mobile station using the estimated second value and the first value, controlling the transceiver for transmitting information about the estimated channel to the BTS.

6. The first mobile station according to claim 4, wherein the first mobile station is a MUROS mobile station and the second mobile station is a legacy mobile station, and
wherein the MUROS mobile station indicates a mobile station having the capability for MUROS.

7. A method for estimating an absolute value of power level in a Multiple Users Reusing One Single time slot (MUROS) system including a pair of two mobile stations connected to A Base Transceiver Station (BTS), the method comprising:
transmitting a complex symbol to a first mobile station and a second mobile station included in the pair;
if a receiving quality for the complex symbol is received from the first mobile station, updating a first value of power level of the first mobile station based on the receiving quality, transmitting the updated first value; and after re-transmitting the complex symbol to the first mobile station and the second mobile station, if information about a channel estimated is received from the first mobile station, allocating power to the first mobile station and the second mobile station using the information.

8. The method according to claim 7, wherein the channel is estimated by using the updated first value and a second value of the second mobile station, and
wherein the second value is estimated by using the first value and the mean value of signal strength determined by using the first value and the complex symbol.

9. The method according to claim 7, wherein the first mobile station is a MUROS mobile station and the second mobile station is a legacy mobile station, and
wherein the MUROS mobile station indicates a mobile station having the capability for MUROS.

10. A Base Transceiver Station (BTS) for estimating an absolute value of power level in a Multiple Users Reusing One Single time slot (MUROS) system including the pair of two mobile stations connected to the BTS, the BTS comprising:
a transceiver for transmitting a complex symbol to a first mobile station and a second mobile station included in the pair; and
a controller for
updating a first value of power level of the first mobile station based on a receiving quality,
if the receiving quality for the complex symbol is received from the first mobile station, controlling the transceiver for transmitting the updated first value, and
after re-transmitting, by the transceiver, the complex symbol to the first mobile station and the second mobile station, if information about a channel estimated is received from the first mobile station, allocating power to the first mobile station and the second mobile station using the information.

11. The BTS according to claim 10, wherein the channel is estimated by using the updated first value and a second value of the second mobile station, and
wherein the second value is estimated by using the first value and the mean value of signal strength determined by using the first value and the complex symbol.

12. The BTS according to claim 10, wherein the first mobile station is a MUROS mobile station and the second mobile station is a legacy mobile station, and
wherein the MUROS mobile station indicates a mobile station having the capability for MUROS.

* * * * *